United States Patent [19]

Flatley et al.

[11] Patent Number: 4,977,546

[45] Date of Patent: Dec. 11, 1990

[54] SIGNAL STABILIZATION IN OPTICAL HYDROPHONES

[75] Inventors: James P. Flatley, Norwich; Peter Shajenko, Storrs, both of Conn.

[73] Assignee: The United States of America as represented by the Secretary of the Navy, Washington, D.C.

[21] Appl. No.: 347,112

[22] Filed: Jan. 29, 1982

[51] Int. Cl.$^5$ ............................................. H04R 29/00
[52] U.S. Cl. ..................................... 367/140; 367/149
[58] Field of Search ......................... 367/140, 149, 12; 250/227.19, 227.27; 350/96.1

[56] References Cited

U.S. PATENT DOCUMENTS

| | | | |
|---|---|---|---|
| 3,611,277 | 10/1971 | Yoder | 367/174 |
| 3,903,496 | 9/1975 | Stimler | 367/3 |
| 4,115,753 | 9/1978 | Shajenko | 367/149 |
| 4,320,475 | 3/1982 | Leclerc | 367/149 |

OTHER PUBLICATIONS

Giallorenzi, *Optics and Laser Tech.*, Apr. 1981, pp. 73, 74, 76–78.

*Primary Examiner*—Thomas H. Tarcza
*Assistant Examiner*—Daniel T. Pihulic
*Attorney, Agent, or Firm*—Michael J. McGowan; Prithvi C. Lall

[57] ABSTRACT

A system for signal stabilizing in-phase modulated optical hydrophone arrays employs interferometry with homodyne detection. Phase stabilization is accomplished by modulating the input laser signal in proportion to variations in the output of an optical transducer to balance the output phase so that the fringes are kept at optimum position. Additionally, fluctuations in light intensity are compensated for so that a photodetector responds only to phase shift variations. The technique used is to split the input beam into signal and reference beams using a beam divider, exposing the signal beam to the acoustic pressure of interest, recombining the signal beam with the reference beam, detecting the combined beams and filtering the resulting signal to separate out the acoustic information of interest from the phase shift and light intensity portions used to stabilize the input beam. The acoustic information is processed and the phase shift and light intensity information provides a feedback signal for use in input beam stabilization.

4 Claims, 2 Drawing Sheets

SIGNAL STABILIZATION IN OPTICAL HYDROPHONES

STATEMENT OF GOVERNMENT INTEREST

The invention described herein may be manufactured and used by or for the Government of the United States of America for governmental purposes without any payment of royalties thereon or therefor.

BACKGROUND OF THE INVENTION (1) Field of the Invention

The present invention generally relates to feedback signal stabilization techniques and more particularly to the signal stabilization of an optical hydrophone system that uses two interfering light beams to form a fringe pattern.

(2) Description of the Prior Art

Optical hydrophones using interferometry with homodyne detection are very sensitive devices for detecting acoustic signals. When optical fibers are used for guiding a laser light, such hydrophones can operate at large distances from the light sources or data processing equipment. In practical applications, however, the prior art systems have problems associated with them. One of the problems is the signal stability, because relative phase stability between two interfering beams of the interferometer is required. The phase might be affected by fluctuations in temperature, static pressure, vibrations, etc. A second problem is the need for a known phase relation between hydrophones put in an acoustic array. Acoustic arrays are normally used for improving sensitivity and provide directionality of the signal source, where hydrophones are connected together with a known phase relationship, called beamforming. In optical hydrophones the phase relationship must be established.

SUMMARY OF THE INVENTION

A first system for signal stabilizing a hydrophone has an interferometer containing a leg for a d-c reference signal and a leg having an element for sensing an acoustic signal. A fringe pattern is formed across an aperture at the output end of the interferometer. A signal is obtained from any fringe shift and is compared to a portion of the reference signal. A control signal is obtained from the comparison of signals and this control signal is used to provide frequency shifting of the laser source provided to the interferometer.

A second system for signal stabilizing a phased array has an interferometer that receives a modulated laser beam. The interferometer has one leg whose beam is phase shifted by an acoustic signal and the other leg provides a reference beam. The combination of beams forms a fringe pattern across an aperture at the output end of the interferometer. The output of the aperture is fed to a photodetector which in turn generates a signal proportional to the phase shift between the two beams. This signal contains acoustic information and carrier information. The carrier portion is split off and used in a feedback configuration to control the laser frequency shifter. A change in laser frequency causes a change in the phase relation of the beams in the interferometer. The amount of this change is set by the feedback circuitry so as to cause the fringe pattern to be at a 90 degree optimum point.

DESCRIPTION OF THE PREFERRED EMBODIMENTS

Figure 1:
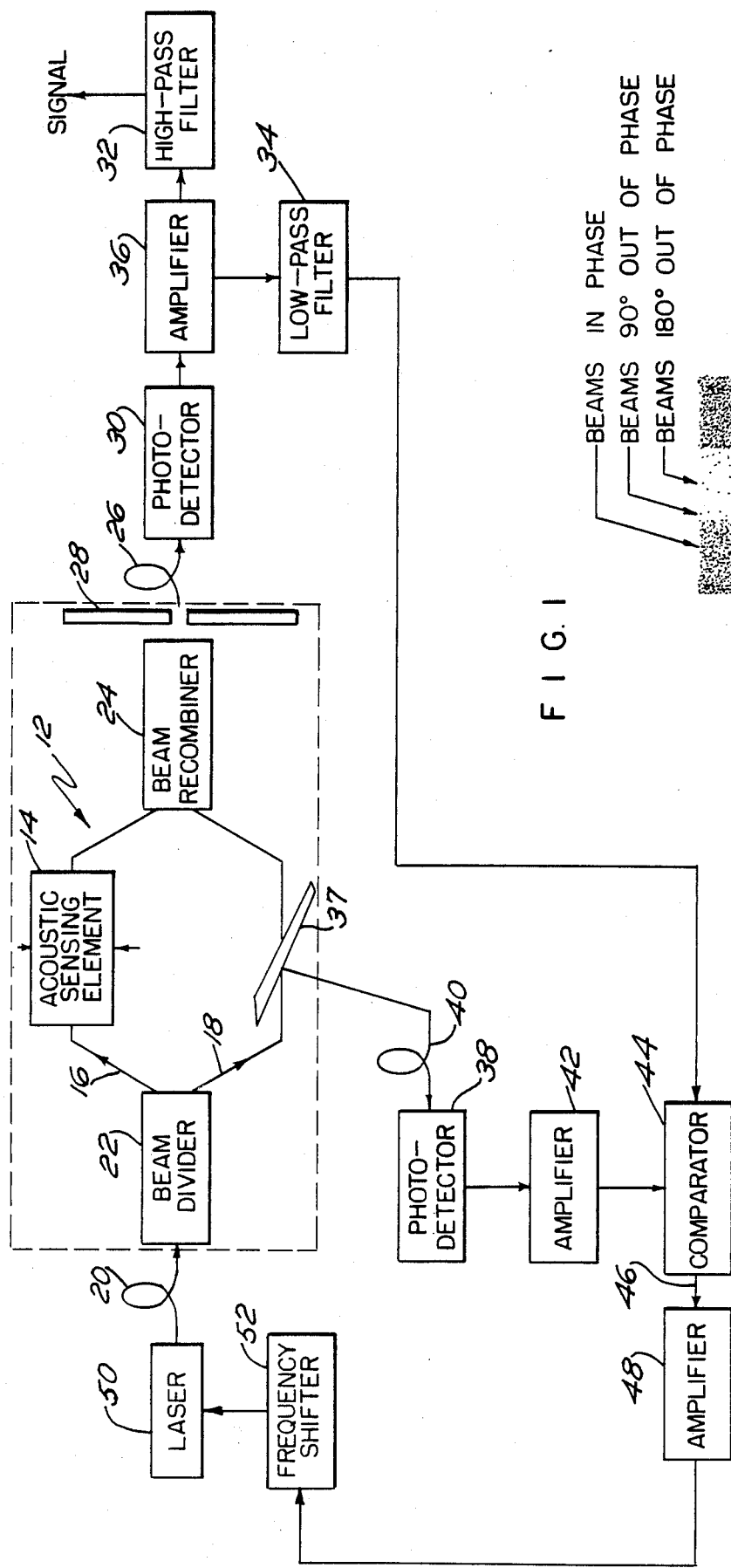
FIG. 1 is a system for signal stabilizing an optical hydrophone.
Figure 2:
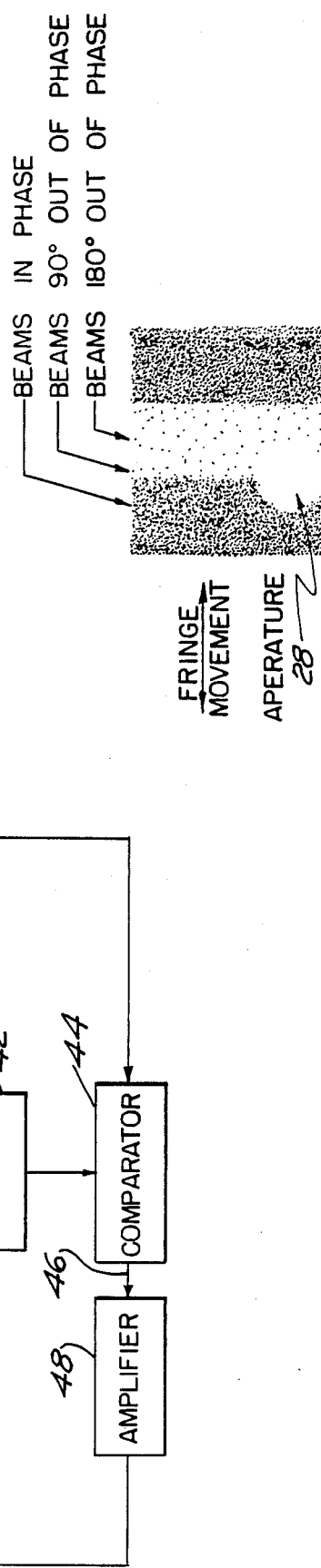
FIG. 2 shows the line fringe pattern provided on a photodetector in the system of FIG. 1 wherein plane waves are interfering.

The optical hydrophone system shown in FIG. 1 comprises an interferometer 12 having an acoustic sensing element 14 for producing information to a signal beam in one of its legs 16. The other leg 18 has a reference beam. The difference in optical pathlength between legs 16 and 18 should be less than the coherent length of light entering the interferometer 12. The light from an input fiber 20 is divided into the signal and reference beams by a beam divider 22, such as a beam splitter, or any similar optical device. When the signal beam's recombined with the reference beam on a beam recombiner 24, a fringe pattern is formed displaying the phase relationship between the reference and signal beams. The fringe pattern can have any configuration, but practically it will consist of line fringes or fringes forming concentric circles, depending on whether plane or spherical waves are interfering. FIG. 2 shows line fringes with the aperture being located where the signal and reference beams are 90 degrees out of phase.

Referring again to FIG. 1 there is shown an output fiber 26 that sees a portion of the fringes through the aperture 28. For optimum utilization of laser light and best performance, both beams are adjusted to form a single fringe across the aperture 28. When the signal beam is phase modulated by the acoustic signal at hydrophone sensing element 14, a minute fringe shift across the aperture 28 will result. This fringe shift is detected as intensity fluctuation of the light beam by photodetector 30. The optimum signal detection occurs when the aperture is located at the 90 degree phase shift point. For a line fringe this is satisfied when the aperture 28 is located halfway between dark and light fringes, i.e., where the value of fringe intensity between maximum and minimum is half, as shown in FIG. 2. For a circular fringe, the half value of light intensity would be midway between maximum and minimum.

A signal stabilization system is derived from the following considerations. It is well known that the phase difference $\phi_o$ between both beams in an interferometer by the relations:

$$\phi_o = \frac{2\pi}{\lambda} l_o, \quad (1)$$

where $l_o$ is the optical path length difference in the interferometer, and $\lambda$ is the wavelength. A change in $l_o$ or a change in $\lambda$ will produce phase shift, as $$\Delta\phi_o = \frac{2\pi}{\lambda} \Delta l_o - \frac{2\pi}{\lambda} l_o \frac{\Delta\lambda}{\lambda}. \quad (2)$$

To keep the phase difference $\phi_o$ constant, i.e., $\Delta\phi_o = 0$, the undesirable variations in $\Delta l_o$ are balanced by varying the wavelength $\Delta\lambda$. This invention provides a system to perform such balancing automatically by phase adjustment where the interferometer can be located at a great distance from the detection and source systems. This is achieved by changing the input wavelength and not touching interferometer 12.

The current from photodetector 30 consists of direct current $i_{dc}$ and signal current $i_{signal}$, which are separated using a high-pass filter 32 and low-pass filter 34 after amplification 36. For a given laser power, the direct current depends on the fringe location on the aperture 28. For an optimum fringe location, i.e., $\phi_o = 90°$, the direct current has a certain value. The shift in phase between two beams results in fringe shift and consequently change in the direct current. The current increases if the shift towards the beams being in phase and the current decreases if the shift is toward the beam being out of phase. From the change in direct current a control volt is derived to shift the wavelength of light entering the inter 12.

The value of the direct current also is affected by the fluctuation in laser power output, fiber attenuation, etc. Normally such fluctuations are always present making the signal stabilization method described above not operative since changes in power level and unwanted fringe shifts cannot be distinguished. This invention provides an additional feature which neutralizes such fluctuations and provides signal stabilization.

For this purpose a beam divider 37 put in leg 18 of the interferometer 12 takes a part of light from the interferometer 12 and sends it to a photodetector 38 via optical fiber 40. The photodetector 38 current is amplified by amplifier 42 and applied to a comparator 44 to offset the current variations caused by laser power fluctuations and attenuation in optical input fibers. The comparator 44 also receives direct current from photodetector 30 passing through low-pass filter 34. Here the currents are compared whereby a control voltage is generated on line 46, which is proportional to the fringe displacement. Control voltage is amplified by amplifier 48 and used for shifting the wavelength of light before the input fiber 20. Any known method for shifting the wavelength of a laser 50 or the wave or frequency shifting device 52 can be applied. By shifting the wavelength of light the fringe on the aperture 28 will be shifted toward the optimum position, causing the control voltage from comparator 44 to be brought to a null point.

The above system provides signal stabilization in one optical hydrophone. But the phase of the acoustic signal is arbitrary, hence, beamforming in an array cannot be applied. The following system provides both the signal stabilization and signal phase.

Figure 3:
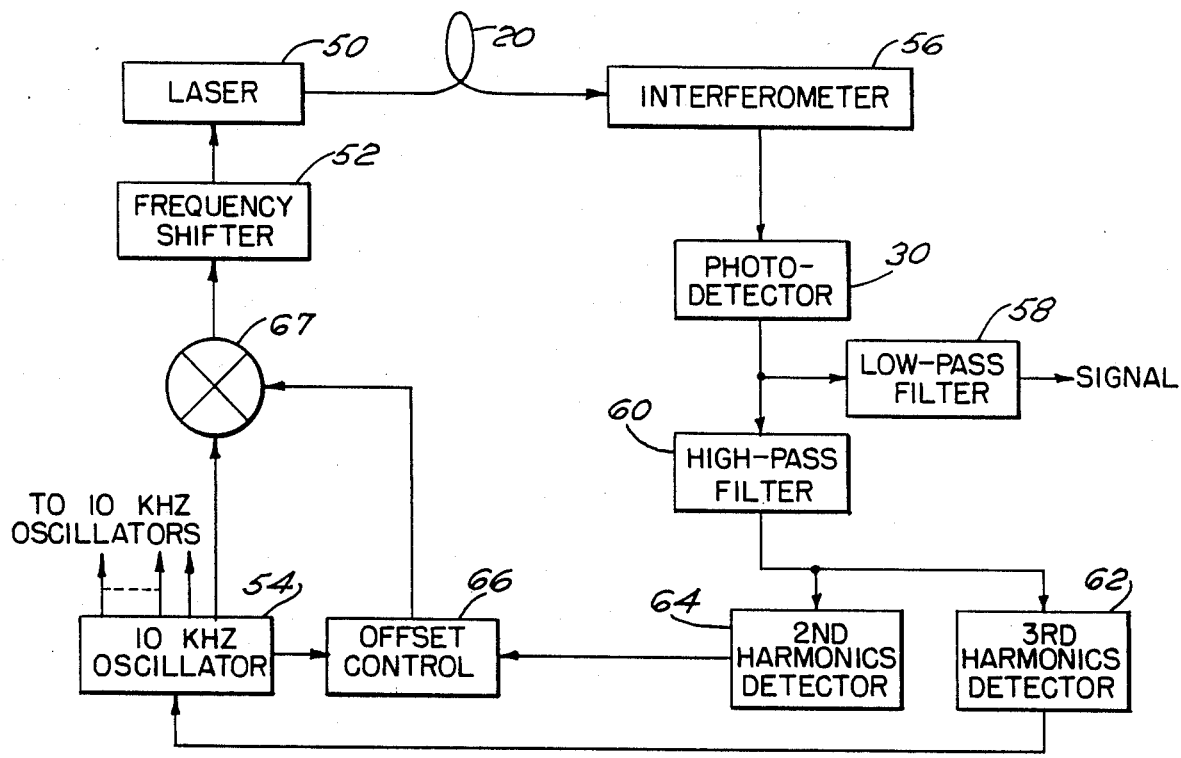
FIG. 3 is an alternate system for signal stabilizing an optical hydrophone.

Refer now to FIG. 3 like components to those in FIG. 1 have the same numeral. The laser light entering input fiber 20 is frequency modulated at a rate of 10 kHz, as determined by the oscillator 54. The frequency modulation is applied to the frequency shifter device 52 which in turn modulates the laser 50.

The modulation index or the actual value of the frequency shift occurring at a rate of 10 kHz, depends on the requirement which is to bring the fringe to its optimum position across the aperture as shown in FIG. 2. The maximum frequency shift required for this operation is:

$$\Delta \nu = \frac{\nu \lambda}{l_o} \quad (3)$$

Since $$\frac{\nabla \nu}{\nu} = \frac{\Delta \nu}{\lambda}$$

and $\nu$ is laser frequency. Hence, the maximum frequency shift required for a given laser depends on the interferometer design, i.e., the optical path length difference $l_o$. For $l_o = 10$ cm, $\phi \nu = 3.7$ gHz.

A laser light of 3.7 gHz is frequency modulated at the rate of 10 kHz and enters interferometer 56 from the input fiber 20. Interferometer 56 differs from interferometer 12 of FIG. 1 in that it does not have a beam divider in the reference leg. In a similar manner, both beams are recombined to form a single fringe on aperture 28 of the output fiber 26, guiding intensity modulated light to photodetector 30. The acoustic portion of the signal is separated from the 10 kHz signal using a low-pass filter 58 and high-pass filter 60, respectively.

Figure 4:
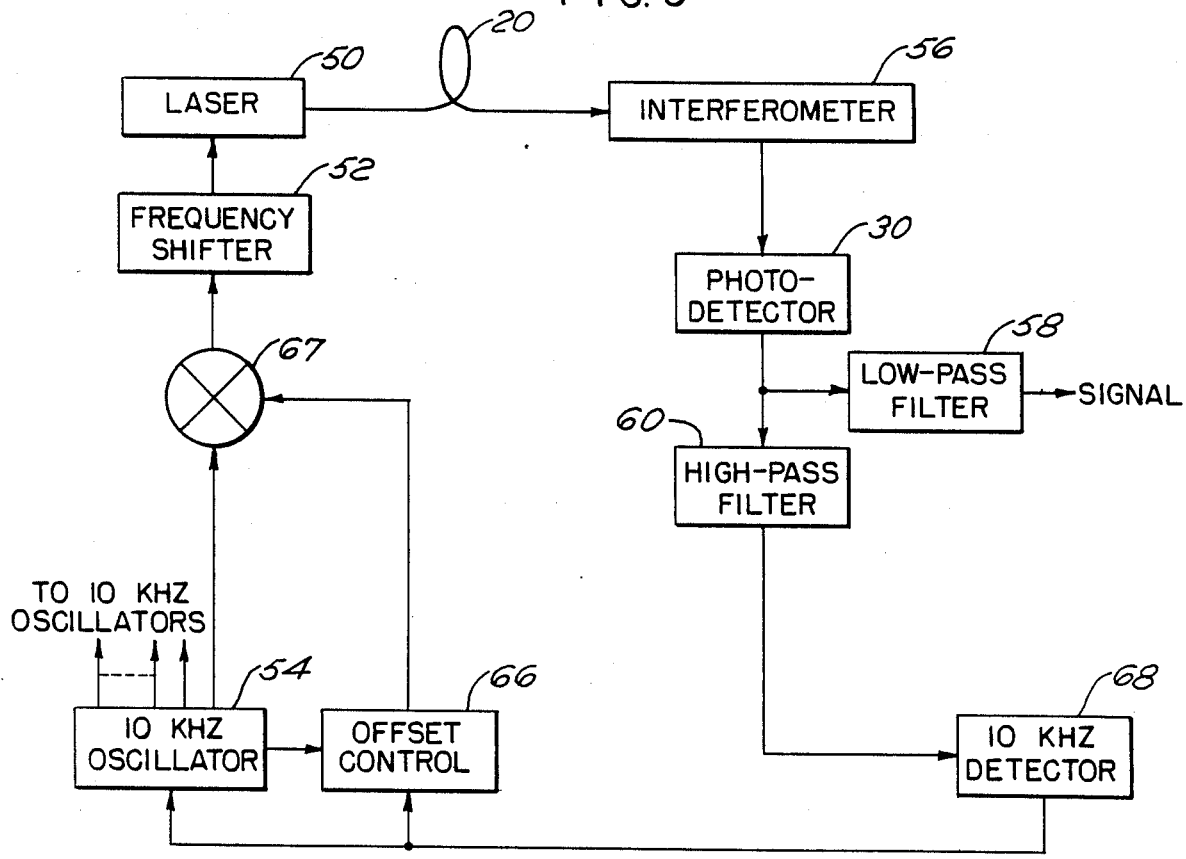
FIG. 4 shows a modification of the system of FIG. 3.

The 10 kHz signal is a control signal used for keeping the fringe at an optimum position at the aperture of interferometer 56 causing optimum phase difference. One approach is to use the distortion in the 10 kHz control signal which results from improper fringe positions. At first, the presence of a 3rd harmonic is detected by 62, which provides drive level commands for bringing the light modulation down within the required range, i.e., 10 kHz control signal appears without third harmonic distortion. The presence of a 2nd harmonic, as detected by 64 indicates the fringe is shifted from the optimum position. The content of 2nd harmonic will energize offset control 66 to produce a direct current offset voltage. The direct current offset voltage is applied to a summer 67 along with the 10 kHz signal. The signal from summer 67 is applied to frequency shifting device 52 for shifting the frequency of light before entering the input fiber 20. The polarity of the required frequency shift is determined from the phase relation between the 2nd harmonic and the 10 kHz oscillator. Another approach as shown in FIG. 4 is to use the 10 kHz control signal derived through high-pass filter 60 directly. A 10 kHz detector 68 will assure that the 10 kHz signal is at maximum. A shift of the optimum position will be shown as reduction in signal strength. Drive level command to oscillator 54 and offset control 66 will be energized to shift the light frequency to produce maximum signal strength. When the 10 kHz oscillator 54 frequency reference is applied to the other 10 kHz oscillators of an acoustic array, it provides a reference phase for all hydrophones. All hydrophones in the array have individual signal stabilization systems with components identical to the one described. Therefore, the phase of acoustic signals in the array become determined for beamforming.

There has therefore been described a signal stabilized optical hydrophone system where fluctuation in direct current caused by fringe shift across the aperture of the output fiber is used for signal stabilization. There has also been described a system wherein an array of optical hydrophones are signal stabilized and phased through the insertion of a 10 kHz control signal.

It will be understood that various changes in details, materials, steps and arrangement of parts which have been herein described and illustrated in order to explain the nature of the invention, may be made by those skilled in the art within the principal and scope of the invention as expressed in the appended claims.

What is claimed is:

1. A signal stabilized optical hydrophone comprising:
interferometer means for providing a reference beam and a fringe pattern;
a first photodetector optically connected to receive said fringe pattern and provide an output electrical signal having the fringe pattern information, said output electrical signal comprised of a signal current and a direct current;
a high pass filter connected to receive said output electrical signal and conducting the signal current and inhibiting the flow of the direct current;
a low pass filter connected to receive said output electrical signal and conducting the direct current and inhibiting the flow of the signal current;
a second photodetector optically connected to receive said reference beam and providing an output electrical signal having said reference beam information;
a comparator connected to receive the output electrical signal from said second photodetector and the direct current from said low pass filter and providing an output signal of the difference;
a frequency shifter connected to receive the output signal of said comparator and providing an output signal suitable for shifting the frequency of a laser; and
a laser connected to receive the output signal of said frequency shifter and for optically providing a beam to said interferometer.

2. A signal stabilized optical hydrophone according to claim 1 wherein said interferometer means further comprises:
a beam divider receiving the beam from said laser and providing a pair of identical beams;
a signal leg receiving one of said pair of identical beams;
a reference leg receiving the other of said pair of identical beams;
an acoustic sensing element connected into said signal leg for modulating said one of said pair of identical beams;
a beam divider connected into said reference leg for dividing in two the other of said pair of identical beams into two identical reference beams, one of said reference beams being conducted to said second photodetector;
a beam recombiner connected to receive the modulated one of said pair of beams and the other of said reference beams and conbining the received beams into a fringe pattern: and
an aperture aligned with said beam recombiner for transmitting a portion of said fringe pattern to said first photodetector.

3. A signal stabilized optical hydrophone comprising:
interferometer means for providing a fringe pattern;
a photodetector connected to receive said fringe pattern and provide an output electrical signal having the fringe pattern information, said output electrical signal comprised of a signal current and a ten kHz current;
a high pass filter connected to receive said output electrical signal and conducting the ten kHz current and inhibiting the flow of the signal current;
a low pass filter connected to receive said output electrical signal and conducting the signal current and inhibiting the flow of the ten kHz current;
a second harmonic detector connected to said high pass filter for detecting the second harmonic of said ten kHz current;
a third harmonic detector connected to said high pass filter for detecting the third harmonic of said ten kHz current;
a ten kHz oscillator connected to said third harmonic detector for receiving the third harmonic signal and providing a ten kHz signal;
an offset control connected to said second harmonic detector for receiving the second harmonic signal and to said ten kHz oscillator for receiving the ten kHz signal;
a summer connected to said ten kHz oscillator and said offset control for receiving their respective outputs;
a frequency shifter connected to receive the output signal of said summer and providing an output signal suitable for shifting the frequency of a laser; and
a laser connected to receive the output signal of said frequency shifter and for providing a beam to said interferometer.

4. A signal stabilized optical hydrophone array system comprising:
a plurality of interferometer means for providing a plurality of respective fringe patterns and provide a plurality of respective output electrical signals having the respective fringe pattern information, each of said output electrical signals comprised of a signal current and a ten kHz current;
a plurality of high pass filters connected to respectively receive each of said output electrical signals and conducting the ten kHz current and inhibiting the flow of the signal current;
a plurality of low pass filters to respectively receive each of said output signals and conducting the signal current and inhibiting the flow of the ten kHz current;
a plurality of second harmonic detectors connected to respective members of said plurality of high pass filters for detecting the second harmonic of said ten kHz current;
a plurality of third harmonic detectors connected to respective members of said plurality of high pass filters for detecting the third harmonic of said 10 kHz current;
a plurality of ten kHz oscillators interconnected for synchronization and connected to respective members of said plurality of third harmonic detectors for receiving the third harmonic signal and each of said plurality of ten kHz oscillators providing respective ten kHz signals;
a plurality of offset controls connected to respective members of said plurality of second harmonic detectors for receiving the second harmonic signal and to respective members of said plurality of ten kHz oscillators for receiving the respective ten kHz signals;
a plurality of summers connected to respective members of said plurality of ten kHz oscillators and respective members of said plurality of offset controls for receiving their respective outputs;
a plurality of frequency shifters connected to receive respective output signals of said plurality of summers and providing respective output signals suitable for shifting the frequency of a laser; and
a plurality of lasers connected to receive the respective output signals of said plurality of frequency shifters for providing a plurality of respective beams to respective members of said plurality of interferometers.

* * * * *